(12) United States Patent
Hu

(10) Patent No.: US 6,805,582 B2
(45) Date of Patent: Oct. 19, 2004

(54) STACKED ELECTRICAL CARD CONNECTOR ASSEMBLY WITH MULTI-FUNCTION GROUNDING MEMBERS

(75) Inventor: Suower Hu, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/300,302

(22) Filed: Nov. 19, 2002

(65) Prior Publication Data

US 2003/0232521 A1 Dec. 18, 2003

(30) Foreign Application Priority Data

Jun. 13, 2002 (TW) .................................... 91208811 U

(51) Int. Cl.[7] .......................... H01R 13/60; H01R 13/66
(52) U.S. Cl. ......................... 439/567; 439/74; 439/946
(58) Field of Search .................. 439/541, 567–570, 439/946, 92, 74

(56) References Cited

U.S. PATENT DOCUMENTS

| | | | | |
|---|---|---|---|---|
| 5,807,137 A | * | 9/1998 | Janota et al. ............... | 439/607 |
| 6,019,633 A | * | 2/2000 | Tung et al. ................. | 439/570 |
| 6,071,130 A | * | 6/2000 | Johnson ....................... | 439/92 |
| 6,106,331 A | | 8/2000 | Kurotori et al. ............ | 439/567 |
| 6,116,925 A | * | 9/2000 | Tung .......................... | 439/101 |
| 6,183,273 B1 | * | 2/2001 | Yu et al. ...................... | 439/92 |
| 6,299,455 B1 | * | 10/2001 | Dong ........................... | 439/59 |
| 6,364,700 B1 | * | 4/2002 | Zhu et al. .................... | 439/567 |
| 2001/0021606 A1 | * | 9/2001 | Uchiyama et al. ......... | 439/541 |
| 2002/0061669 A1 | * | 5/2002 | Yu ............................... | 439/95 |

* cited by examiner

*Primary Examiner*—Michael C. Zarroli
(74) *Attorney, Agent, or Firm*—Wei Te Chung

(57) ABSTRACT

A stacked electrical card connector assembly (1) includes a first electrical card connector (2), a second electrical card connector (3), a pair of boardlocks (4), and a pair of grounding members (5). The grounding members attach the two electrical card connectors together, and provide grounding for electrical cards respectively received in the electrical card connectors. Each grounding member includes a base plate (51) with a pair of spaced spring arms (510) extending generally coplanarly from one main edge thereof. Free ends of the spring arms resiliently press against sides of corresponding electrical cards received in the electrical card connectors. Thus any unnecessary or undesired electrical current can be removed before the electrical cards are electrically engaged with the electrical card connectors. The boardlocks are used for fixing the stacked electrical card connector assembly on a printed circuit board.

16 Claims, 5 Drawing Sheets

STACKED ELECTRICAL CARD CONNECTOR ASSEMBLY WITH MULTI-FUNCTION GROUNDING MEMBERS

BACKGROUND OF THE INVENTION

1. Field of the Invention

The present invention relates to electrical connector assemblies, and particularly to stacked electrical card connector assemblies with multi-function grounding members.

2. Description of Related Art

A conventional electrical card connector, disclosed in U.S. Pat. Nos. 6,095,864, 6,135,792 and 6,352,438 and Taiwan Patent Issue Nos. 238005, 244032 and 244643, is designed to receive a single electrical card and is mounted on a printed circuit board (PCB) for electrically connecting the electrical card received therein with an electrical circuit of the PCB. The electrical card connector usually has a grounding member which electrically connects an outer shell of the electrical card to the grounding circuit of the PCB. Thus any unnecessary or undesired electrical current can be grounded before the electrical card is electrically engaged with the connector. More details about this kind of electrical card connector can be found in "Memory Card Connector" (pp. 40~42, February, 1998, Connector Specifier).

Due to continuing trends toward miniaturization and improved electrical performance in the electronics industry, requirements for smaller components and higher electrical speeds are constantly being promulgated. Electrical card connectors such as the one mentioned above need to be made more compact, in order to save space in electronic devices in which these connectors are to be installed. In addition, more than one electrical card are needed inside certain electronic devices, to provide more functions for the device or to provide for transferring and saving of information. Each additional electrical card needed requires a corresponding additional electrical card connector. The simplest way to provide a plurality of electrical card connectors in a limited space is to stack the electrical card connectors on top of each other.

Connecting members are generally provided for assembling the conventional stacked electrical card connectors together, and individual grounding members are usually separately provided for each electrical card connector. Each grounding member electrically connects the outer shell of the corresponding electrical card to the grounding circuit of the PCB.

Another kind of stacked electrical card connector assembly comprises one integral grounding member which electrically connects the outer shells of all the electrical cards to the grounding circuit of the PCB.

In the two above-described kinds of conventional stacked electrical card connector assemblies, the connecting members and the grounding members are provided separately, and they perform their respective functions independently. That is, the connecting members merely fix the electrical card connectors together, and the grounding members merely ground the electrical cards. This need for numerous components makes the manufacturing of the assemblies unduly time-consuming and costly. Furthermore, the numerous components add to space occupied by the connector assemblies.

In view of the above, a new electrical card connector assembly with multi-function grounding members that overcomes the above-mentioned problems is desired.

SUMMARY OF THE INVENTION

Accordingly, an object of the present invention is to provide an electrical card connector assembly having multi-function grounding members which attach two or more electrical card connectors together and which provide convenient grounding connection between electrical cards received in the electrical card connector assembly and an associated PCB.

To achieve the above-mentioned object, a stacked electrical card connector assembly in accordance with a preferred embodiment of the present invention comprises a first electrical card connector, a second electrical card connector, a pair of boardlocks and a pair of grounding members. The grounding members attach the two electrical card connectors together, and provide grounding for electrical cards respectively received in the electrical card connectors. Each grounding member comprises a base plate with a pair of spaced spring arms extending generally coplanarly from one main edge thereof. Free ends of the spring arms resiliently press against sides of corresponding electrical cards received in the electrical card connectors. Thus any unnecessary or undesired electrical current can be removed before the electrical cards are electrically engaged with the electrical card connectors. The boardlocks are used for fixing the stacked electrical card connector assembly on a PCB.

Other objects, advantages and novel features of the invention will become more apparent from the following detailed description when taken in conjunction with the accompanying drawings, in which:

DETAILED DESCRIPTION OF PREFERRED EMBODIMENT OF THE INVENTION

Reference will now be made to the drawings to describe the present invention in detail.

Figure 1:
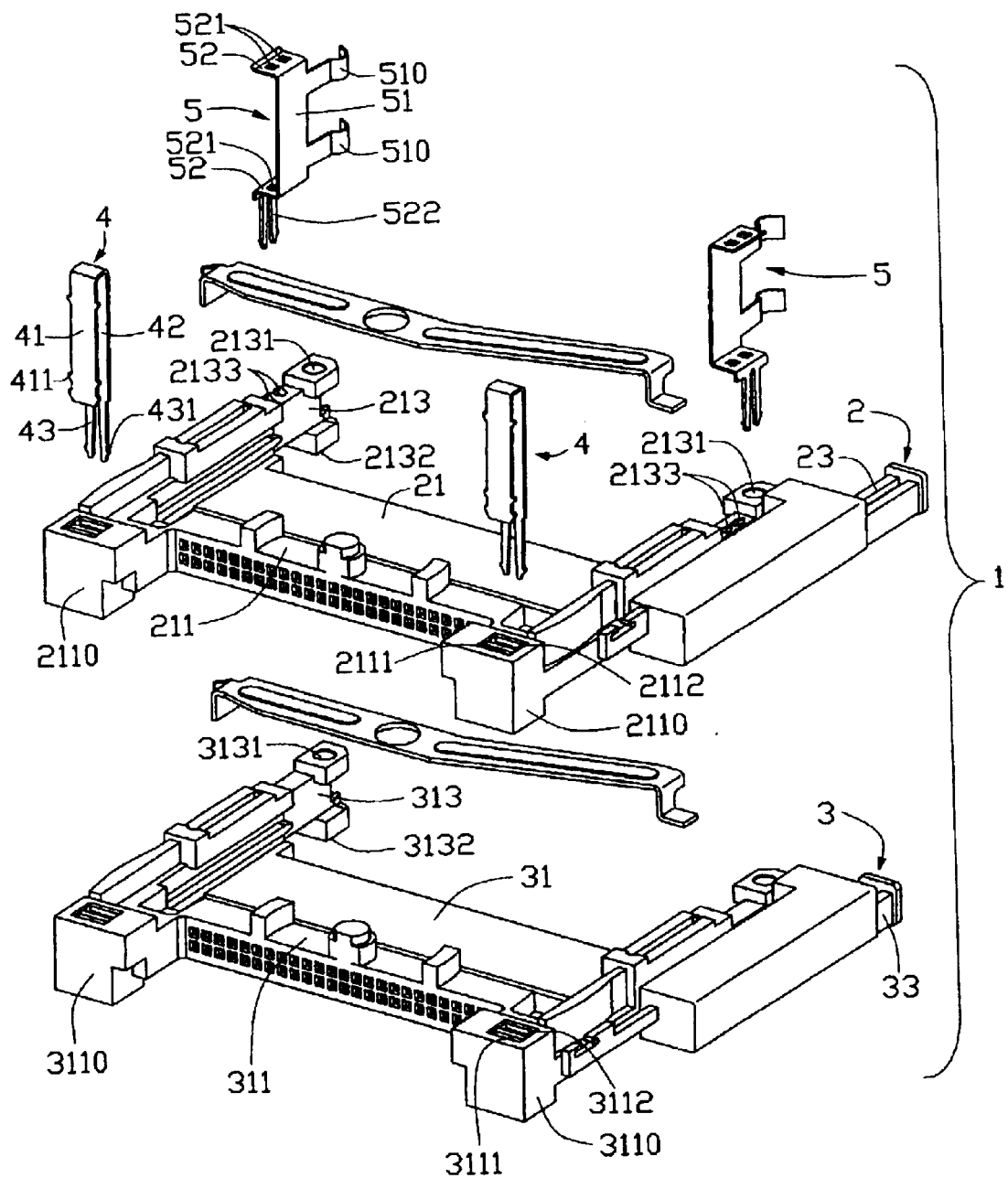
FIG. 1 is an exploded isometric view of a stacked electrical card connector assembly in accordance with a preferred embodiment of the present invention.
Figure 2:
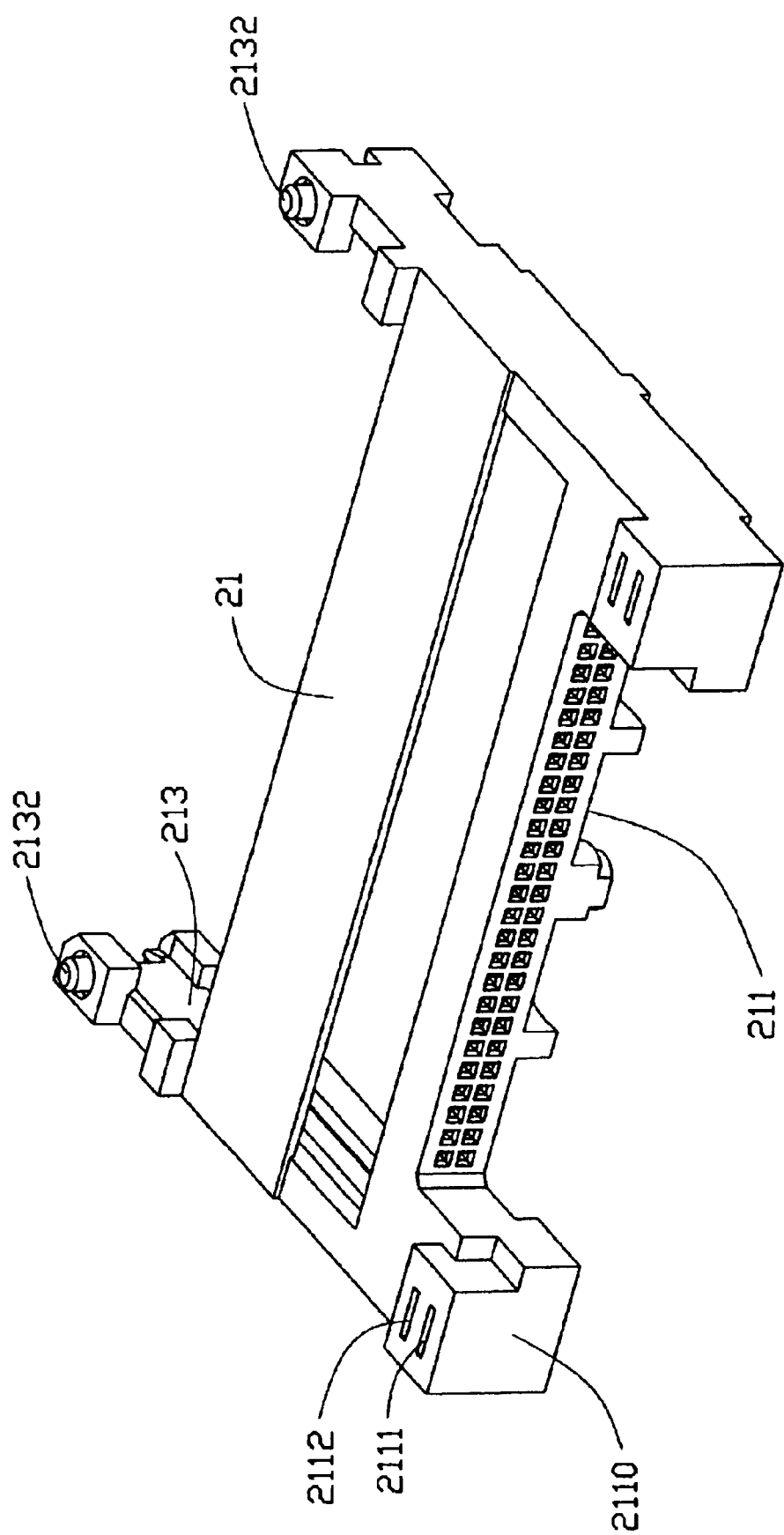
FIG. 2 is an enlarged view of a first electrical card connector of the stacked electrical card connector assembly of FIG. 1, viewed from a bottom aspect.
Figure 3:
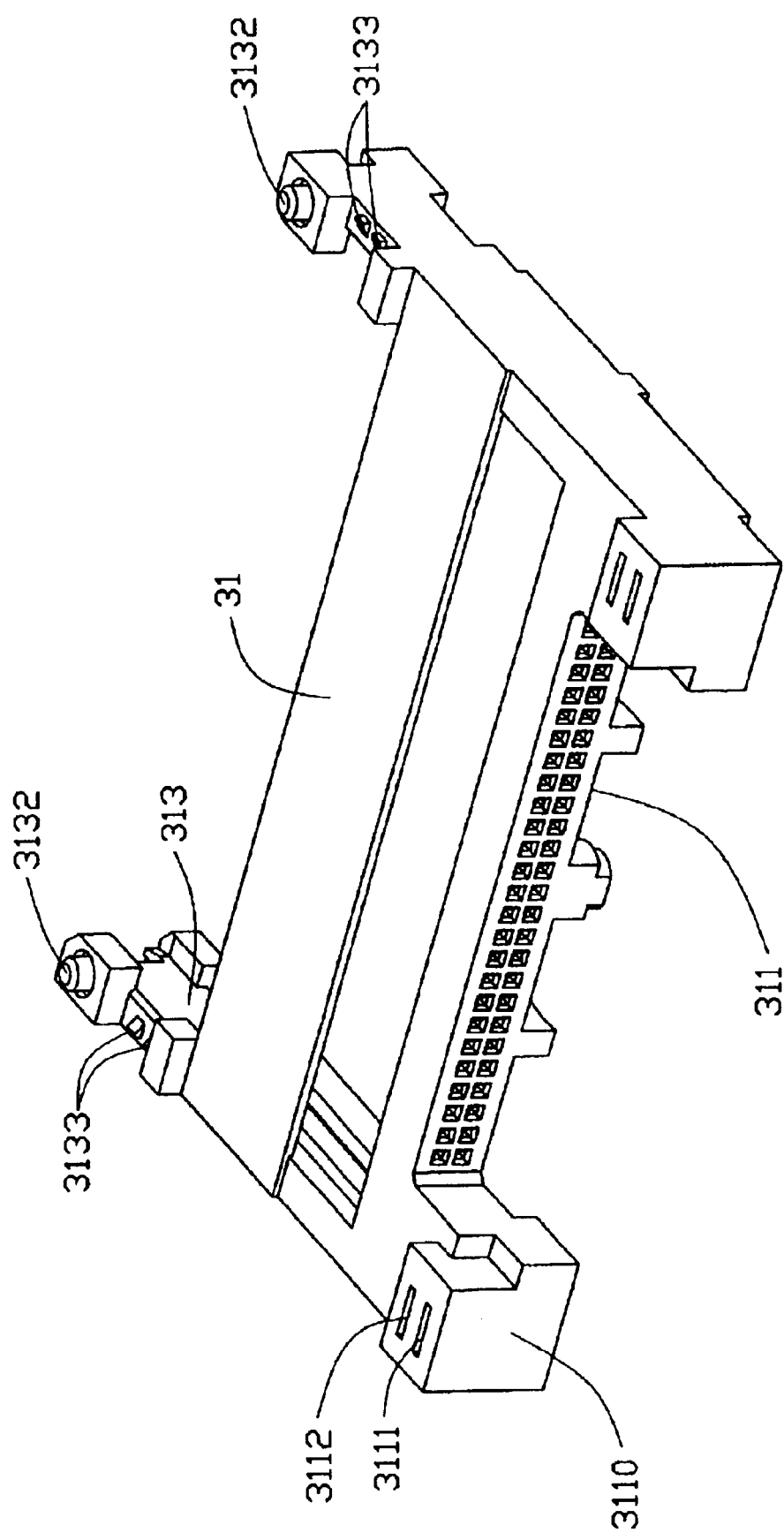
FIG. 3 is an enlarged view of a second electrical card connector of the stacked electrical card connector assembly of FIG. 1, viewed from a bottom aspect.

Referring to FIGS. 1, 2 and 3, an electrical connector assembly 1 in accordance with a preferred embodiment of the present invention comprises a first electrical card connector 2, a second electrical card connector 3, a pair of boardlocks 4 and a pair of grounding members 5.

The first electrical card connector 2 comprises a first frame 21 and a first ejector 23. The first frame 21 comprises a first main portion 211 and a pair of parallel first cantilevers 213 extending from opposite ends of the first main portion 211 respectively. The first ejector 23 is movably assembled to one of the first cantilevers 213. Each first cantilever 213 has a first post 2110 formed at an end thereof proximal to the first main portion 211. Each first post 2110 defines a rectangular first retaining hole 2111 and an adjacent rectangular first connecting hole 2112 therein. A circular first recess 2131 is defined in a top of an end of each first cantilever 213 that is distal from the first main portion 211. A first bulge 2132 is formed at a bottom of the distal end of each first cantilever 213, corresponding to the first recess 2131. A plurality of first protrusions 2133 is formed on the top of the distal end of each first cantilever 213, between the first recess 2131 and the first main portion 211 and near the first recess 2131.

The second electrical card connector 3 is similar to the first electrical card connector 2, and comprises a second frame 31 and a second ejector 33. The second frame 31 comprises a second main portion 311, and a pair of parallel second cantilevers 313 extending from opposite ends of the second main portion 311 respectively. The second ejector 33 is movably assembled to one of the second cantilevers 313. Each second cantilever 313 has a second post 3110 formed at an end thereof proximal to the second main portion 311. Each second post 3110 defines a rectangular second retaining hole 3111 and an adjacent rectangular second connecting hole 3112 therein. A circular second recess 3131 is defined in a top of an end of each second cantilever 313 that is distal from the second main portion 311. A second bulge 3132 is formed at a bottom of the distal end of each second cantilever 313, corresponding to the second recess 3131. A multiplicity of second protrusions 3133 is formed on a bottom of the distal end of each second cantilever 313, between the second bulge 3132 and the second main portion 311 and near the second bulge 3132.

Each grounding member 5 comprises a base plate 51, a pair of parallel retention plates 52 extending perpendicularly from a top end and a bottom end of the base plate 51 respectively, and a pair of spaced spring arms 510 extending generally coplanarly from one main edge of the base plate 51. A pair of receiving holes 521 is defined in each retention plate 52. A forklike fastener 522 depends from a distal end of a bottommost retention plate 52 of each grounding member 5.

Each boardlock 4 is elongated and generally U-shaped. Each boardlock 4 comprises an elongate retention portion 41, an elongate connecting portion 42 parallel and opposite to the retention portion 41, and a forklike fastening portion 43 depending from the connecting portion 42. A plurality of first barbs 411 is formed on opposite side edges of the retention portion 41. A pair of second barbs 431 is formed at distal ends of the forklike fastening portion 43.

Figure 4:
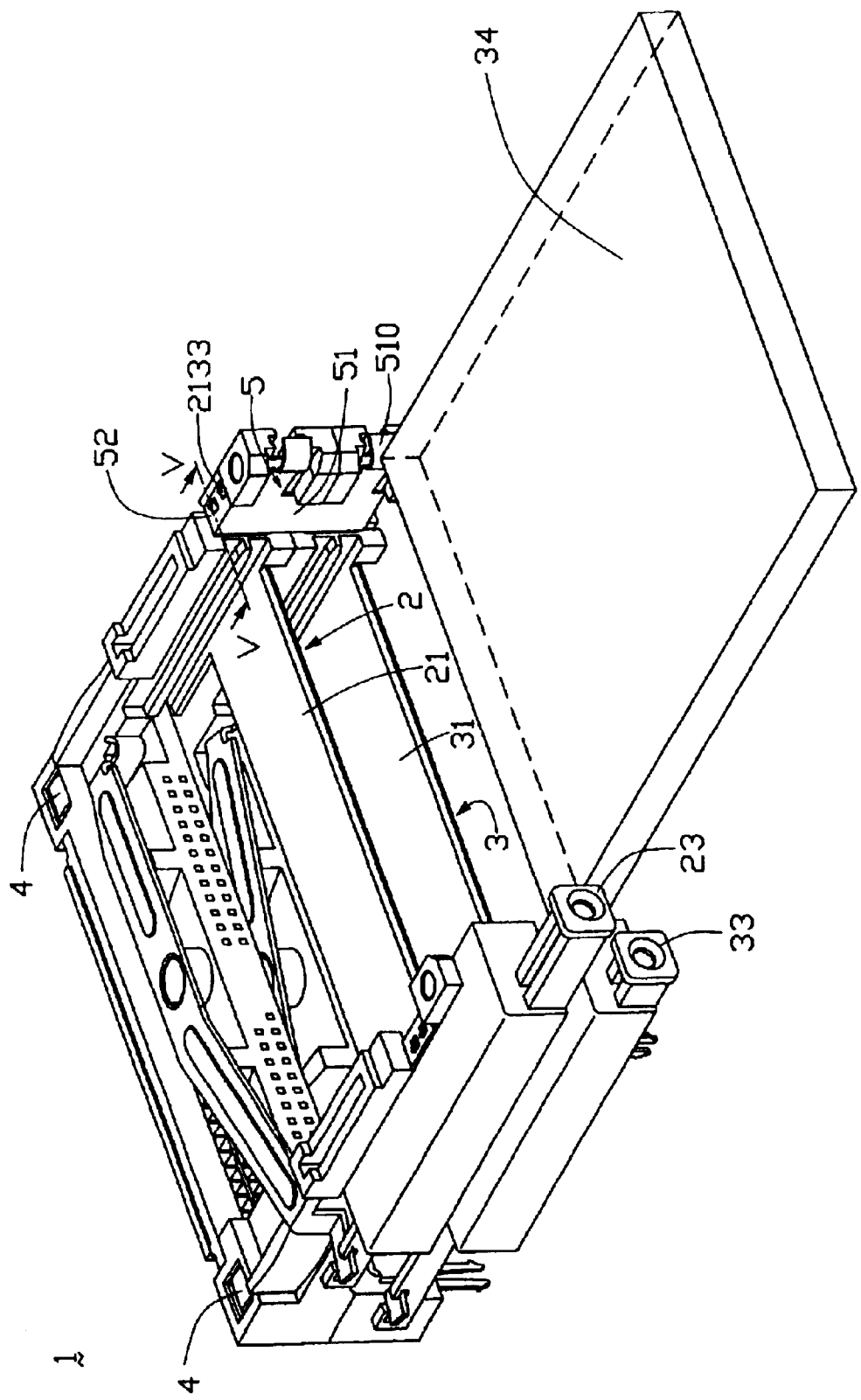
FIG. 4 is an assembled view of FIG. 1, but viewed from another aspect and showing an electrical card ready to be inserted into the second electrical card connector.

Referring to FIG. 4, in assembly, the first electrical card connector 2 is attached on the second electrical card connector 3. The first bulges 2132 of the first electrical card connector 2 are engagingly received in the second recesses 3131 of the second electrical card connector 3. This ensures precise positioning of the first electrical card connector 2 on the second electrical card connector 3. Accordingly, precise positioning of corresponding components of the first and second electrical card connectors 2, 3 is also ensured.

Figure 5:
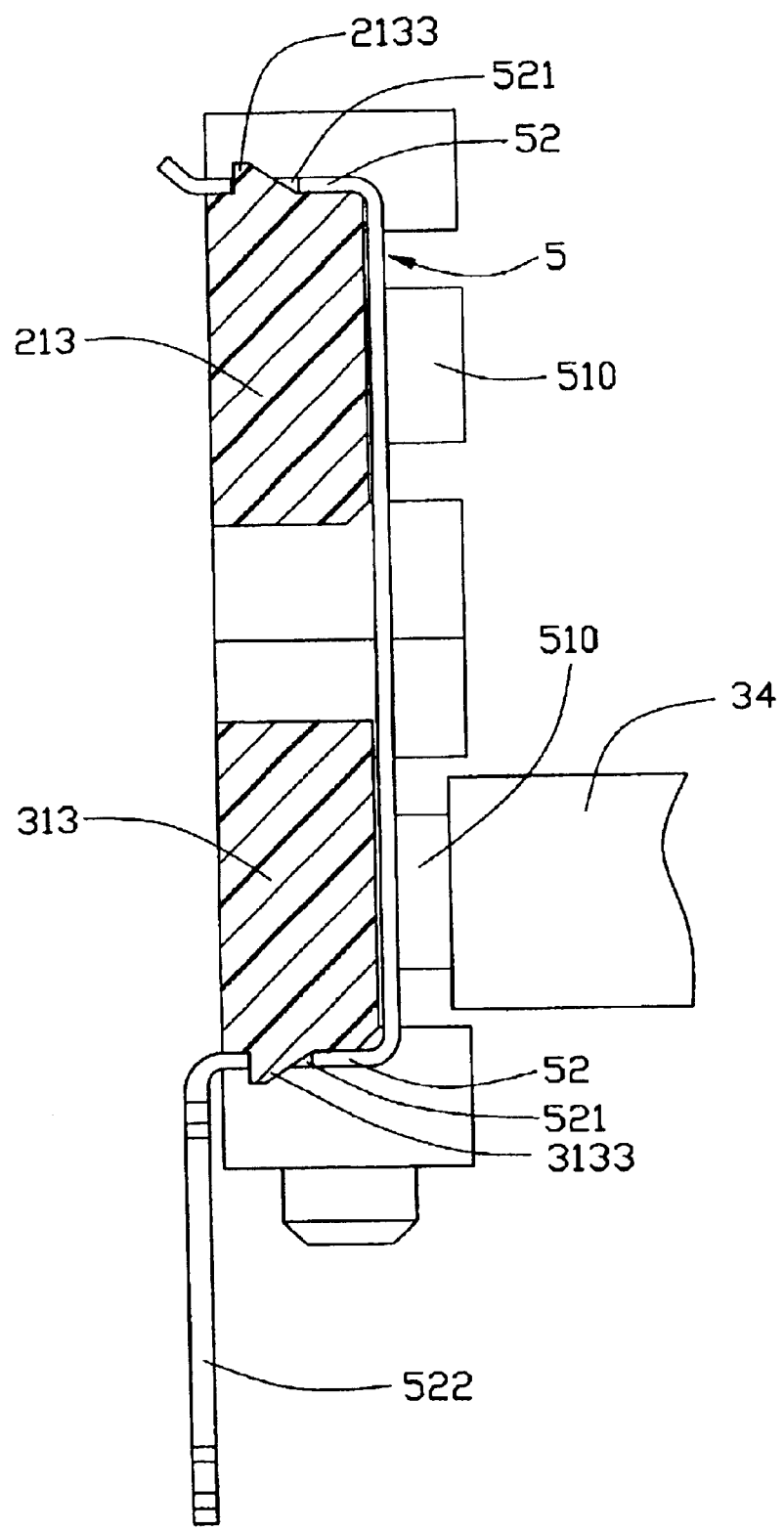
FIG. 5 is a cross-sectional view taken along line V—V of FIG. 4.

Referring particularly to FIG. 5, the grounding members 5 are used for securing the first electrical card connector 2 on the second electrical card connector 3. The grounding members 5 are also used for grounding two electrical cards respectively received in the first and second electrical card connectors 2, 3 (only one electrical card 34 is shown). The receiving holes 521 of a topmost retention plate 52 of each grounding member 5 engagingly receive the corresponding first protrusions 2133 of the first electrical card connector 2. The receiving holes 521 of the bottommost retention plate 52 of each grounding member 5 engagingly receive the corresponding second protrusions 3133 of the second electrical card connector 3. Thus, the first and second electrical card connectors 2, 3 are firmly attached together by the grounding members 5.

When inserting the electrical card 34 into the second electrical card connector 3, a free end of a bottommost spring arm 510 of each grounding member 5 resiliently presses against a side of the electrical card 34. The grounding member 5 is thereby electrically connected with the electrical card 34. Similarly, each grounding member 5 can electrically connect with an electrical card (not shown) inserted into the first electrical card connector 2. The forklike fastener 522 of each grounding member 5 is electrically connected with a grounding circuit of a PCB (not shown). Thus, the grounding members 5 provide convenient grounding connection between the inserted electrical card 34 and the PCB (not shown).

Referring particularly to FIG. 4, the boardlocks 4 are used for fixing the electrical connector card assembly 1 on the PCB (not shown). The retention portions 41 of the boardlocks 4 are received in the corresponding first retaining holes 2111 of the first electrical card connector 2 and the corresponding second retaining holes 3111 of the second electrical card connector 3. The first barbs 411 of the boardlocks 4 interferentially engage in the first and second retaining holes 2111, 3111. The connecting portions 42 of the boardlocks 4 are received in the corresponding first connecting holes 2112 of the first electrical card connector 2 and the corresponding second connecting holes 3112 of the second electrical card connector 3. The fastening portions 43 of the boardlocks 4 protrude below the second frame 31 of the second electrical card connector 3. The boardlocks 4 are then fixed to the PCB (not shown), with the second barbs 431 of the boardlocks 4 being engaged with the PCB (not shown). Thus the electrical connector card assembly 1 is securely fixed on the PCB (not shown) by both the boardlocks 4 and the grounding members 5.

While a preferred embodiment in accordance with the present invention has been shown and described, equivalent modifications and changes known to persons skilled in the art according to the spirit of the present invention are considered within the scope of the present invention as defined in the appended claims.

What is claimed is:

1. A stacked electrical card connector assembly for mounting on a circuit substrate, the stacked electrical card connector assembly comprising:

a first electrical card connector comprising a first frame adapted to receive an electrical card, the first frame having at least one first protrusion formed thereon;

a second electrical card connector in stacked engagement with the first electrical card connector, and comprising a second frame adapted to receive an electrical card, the second frame having at least one second protrusion fanned thereon; and at least one grounding member comprising a base plate with a pair of spring arms extending therefrom, the spring arms being adapted to resiliently press against one or more electrical cards received in the first and second electrical card connectors, the base plate defining at least two holes engagingly receiving the at least one first protrusion and the at least one second protrusion of the first and the second frames respectively.

2. The stacked electrical card connector assembly as claimed in claim 1, wherein the spring arms extends generally coplanarly from one main edge of the base plate of the at least one grounding member.

3. The stacked electrical card connector assembly as claimed in claim 1, wherein a fastener depends from the base plate of the at least one grounding member.

4. The stacked electrical card connector assembly as claimed in claim 3, wherein the at least one first protrusion is formed on a top of the first frame, and the at least one second protrusion is formed on a bottom of the second frame.

5. The stacked electrical card connector assembly as claimed in claim 4, wherein a pair of retention plates extends perpendicularly from a top and a bottom end of the base plate respectively, and the at least two holes are respectively defined in the retention plates.

6. The stacked electrical card connector assembly as claimed in claim 5, wherein the fastener depends from a distal end of a bottommost retention plate.

7. The stacked electrical card connector assembly as claimed in claim 3, wherein the fastener is forklike.

8. The stacked electrical card connector assembly as claimed in claim 3, wherein the fastener is adapted to electrically connect with the circuit substrate.

9. A stacked electrical connector for mounting to a printed circuit board, comprising:

a first card connector defining a first frame with first inner channels on two sides thereof;

a second card connector stacked upon the first connector and defining a second frame with second inner channels on two sides thereof;

at least one grounding member each including two fastening devices respectively secured to the first frame and the second frame, and two spring arms respectively extending into the first channel and the second channel; wherein said grounding member includes a vertical base plate, from which said two spring arms extend in a lengthwise direction; wherein the two fastening devices extend from the vertical base in a lateral direction.

10. The connector assembly as claimed in claim 9, wherein said two fastening devices commonly clamp said first and second frames therebetween.

11. The connector assembly as claimed in claim 9, wherein said two fastening devices are located outermost relative to the vertical base plate.

12. The connector assembly as claimed in claim 9, further including retention legs extending downwardly from a bottom thereof for retainably soldering to the printed circuit board.

13. An electrical connector assembly comprising:

a printed circuit board;

a first card connector seated upon the printed circuit board and defining a first frame with first inner channels on two sides thereof;

a second card connector stacked upon the first connector and defining a second frame with second inner channels on two sides thereof;

at least one grounding member each including two fastening devices respectively secured to the first frame and the second frame, and two spring arms respectively extending into the first channel and the second channel; wherein said grounding member includes a vertical base plate, from which said two spring arms extend in a lengthwise direction; wherein the two fastening devices extend from the vertical base in a lateral direction.

14. The connector assembly as claimed in claim 13, wherein said two fastening devices commonly clamp the first frame and the second frame therebetween.

15. The connector assembly as claimed in claim 13, wherein and second electronic cards respectively are inserted into the first and second channels and mechanically and electrically engaged with the corresponding first and second spring arms for grounding.

16. The connector assembly as claimed in claim 13, further including retention legs extending downwardly from a bottom thereof for retainably for retainably soldering to the printed circuit board.

* * * * *